United States Patent
Uranishi

(10) Patent No.: US 8,262,549 B2
(45) Date of Patent: Sep. 11, 2012

(54) ROLLING BEARING DEVICE AND ROLL APPARATUS FOR CONTINUOUS CASTING INSTALLATION

(75) Inventor: Takeharu Uranishi, Sakai (JP)

(73) Assignee: JTekt Corporation, Osaka-Shi, Osaka (JP)

( * ) Notice: Subject to any disclaimer, the term of this patent is extended or adjusted under 35 U.S.C. 154(b) by 298 days.

(21) Appl. No.: 12/733,799

(22) PCT Filed: Sep. 19, 2008

(86) PCT No.: PCT/JP2008/067003
§ 371 (c)(1),
(2), (4) Date: Mar. 19, 2010

(87) PCT Pub. No.: WO2009/038184
PCT Pub. Date: Mar. 26, 2009

(65) Prior Publication Data
US 2010/0227749 A1 Sep. 9, 2010

(30) Foreign Application Priority Data
Sep. 21, 2007 (JP) .............................. P2007-245576

(51) Int. Cl.
*B21B 27/02* (2006.01)
*F16C 19/54* (2006.01)
(52) U.S. Cl. ................. 492/1; 492/15; 492/47; 384/452; 384/455; 384/558
(58) Field of Classification Search .................. 492/1, 2, 492/6, 7, 15, 47; 384/452, 455, 558
See application file for complete search history.

(56) References Cited

U.S. PATENT DOCUMENTS

| 4,129,343 A | 12/1978 | Janssen |
| 4,834,561 A * | 5/1989 | Benton et al. ................. 384/559 |
| 5,823,687 A * | 10/1998 | Matsuda ....................... 384/558 |

(Continued)

FOREIGN PATENT DOCUMENTS

DE 1 201 128 B 9/1965

(Continued)

OTHER PUBLICATIONS

European Search Report dated Nov. 24, 2011.

*Primary Examiner* — Essama Omgba
(74) *Attorney, Agent, or Firm* — McGinn IP Law Group PLLC

(57) ABSTRACT

A tapered roller thrust bearing is disposed in each of both sides in an axial direction of a cylindrical roller bearing with aligning housing ring which is provided with an inner ring, an outer ring, cylindrical rollers and an aligning housing ring. The tapered roller thrust bearing is constituted by disposing tapered rollers between a first raceway surface which is an outer side face in the axial direction of the outer ring and a second raceway surface of a side raceway ring disposed in an outer side in the axial direction of the outer ring. An intersection of lines extended from generatrices of each of the tapered rollers which are in contact with the first raceway surface and the second raceway surface, and an intersection of lines extended from the first raceway surface and the second raceway surface are disposed on a curvature center of the aligning sliding surface.

4 Claims, 2 Drawing Sheets

U.S. PATENT DOCUMENTS 7,093,981 B2 *  8/2006  Masui et al. .................. 384/558

FOREIGN PATENT DOCUMENTS

| DE | 296 15 500 U1 | 10/1996 |
|----|---------------|---------|
| JP | 59-29816 | 2/1984 |
| JP | 59-34019 | 2/1984 |
| JP | 61-229453 | 10/1986 |
| JP | 63-172012 | 7/1988 |
| JP | 10-68415 | 3/1998 |
| JP | 2000-24760 | 1/2000 |
| JP | 2001-41230 | 2/2001 |
| JP | 2001-107955 | 4/2001 |
| JP | 2001-208053 | 8/2001 |

* cited by examiner

ROLLING BEARING DEVICE AND ROLL APPARATUS FOR CONTINUOUS CASTING INSTALLATION

TECHNICAL FIELD

The present invention relates to a rolling bearing device which can be used for supporting, for example, a roll of a continuous casting installation, and to a roll apparatus for a continuous casting installation incorporating this rolling bearing device.

BACKGROUND ART

In order to convey a strip-shaped cast piece (slab) drawn out of a mould, a continuous casting installation is provided with a roll apparatus in which several to several tens of segments, each having a plurality of roll bodies, are arranged in a conveying direction.

The roll body of this roll apparatus is deflected in a radial direction by a high load applied thereto from the slab side. Therefore, is rotatably supported by a rolling bearing with aligning housing ring so as to absorb this deflection. Also, the roll body is thermally expanded in an axial direction by heat transferred thereto from the slab. Therefore, one axial end thereof is supported by a self-aligning roller bearing in an axially-restrained (fixed) condition, while the other axial end thereof is supported in an axially-movable condition by a cylindrical roller bearing with aligning housing ring in which inner and outer rings are movable relative to each other (see Japanese Patent Publication No. 61-229453A).

However, in the fixed-side self-aligning cylindrical roller bearing, two-peak wear due to differential slip is liable to develop on a raceway surface because of its structure. The two-peak wear invites damage such as separation since stresses concentrate on peak portions of the raceway surface. Therefore, it can become the cause of a lowered durability of the bearing. The roll apparatus of the continuous casting installation is formed by arranging several to several tens of segments (each comprising the plurality of roll bodies) in the conveying direction. Therefore, when one of the self-aligning roller bearings is damaged, the whole of the relevant segment must be replaced, and the rate of operation of the installation is considerably lowered.

In order to solve the problem encountered with the above self-aligning roller bearing, it is proposed in Japanese Patent Publication No. 10-68415A to use a combination of a cylindrical roller bearing with aligning housing ring and a deep groove ball bearing as a rolling bearing device for supporting the fixed side of a roll body. Namely, in this technique, the cylindrical roller bearing mainly receives a radial load from the roll body, and the deep groove ball bearing receives an axial load from the roll body, thereby restraining an axial movement of the roll.

DISCLOSURE OF THE INVENTION

Problem to be Solved by the Invention

However, in the technique disclosed in Japanese Patent Publication No. 10-68415A, the cylindrical roller bearing with aligning housing ring and the deep groove ball bearing are merely arranged side by side in the axial direction. Therefore, there is encountered a problem that the function (aligning function) of absorbing a deflection of the roll body by the cylindrical roller bearing with aligning housing ring is adversely affected by the deep groove ball bearing.

In addition, since the cylindrical roller bearing with aligning housing ring and the deep groove ball bearing are arranged side by side in the axial direction, a large installation space is required in the axial direction. Furthermore, both of the cylindrical roller bearing and the deep groove ball bearing must be mounted on a housing. Therefore, there is also encountered a problem that the structure of this housing becomes complicated.

The present invention is made in view of these circumstances, and it is an object of the invention to provide a rolling bearing device which can support an axial load while maintaining an aligning function, and also can be formed into a compact construction in an axial direction. It is also an object of the invention to provide a roll apparatus for a continuous casting installation incorporating such a rolling bearing device.

How to Solve the Problem

A rolling bearing device according to the present invention comprises:
an inner ring, comprising an outer circumference formed with an inner raceway surface;
an outer ring, comprising:
   an inner circumference, formed with an outer raceway surface;
   an axial outer side face, formed with a first raceway surface; and
   an outer circumference, formed with an outer sliding surface having a convex-arcuate axial cross section;
a plurality of cylindrical rollers, rollably disposed between the inner raceway surface and the outer raceway surface;
an aligning housing ring, comprising an inner circumference formed with an aligning sliding surface having a concave-arcuate axial cross section and being in slidable contact with the outer sliding surface;
a side raceway ring, disposed in an axial outer side of the outer ring and formed with a second raceway surface opposing the first raceway surface; and
a plurality of tapered rollers, disposed between the first raceway surface and the second raceway surface,
wherein an intersection of lines extended from generatrices of each of the tapered rollers which are in contact with the first raceway surface and the second raceway surface, and an intersection of lines extended from the first raceway surface and the second raceway surface are disposed on a curvature center of the aligning sliding surface.

With this construction, a radial load applied from a rotation shaft or the like fitted in the inner ring can be supported by a cylindrical roller bearing with aligning housing ring constituted by the inner and outer rings, the cylindrical rollers and the aligning housing ring, and an axial load applied from the rotation shaft or the like can be supported by a tapered roller thrust bearing constituted by the outer ring, the side raceway ring and the tapered rollers.

This tapered roller thrust bearing can be entirely rotated by sliding of the outer ring on the aligning sliding surface. Therefore, an aligning function of the cylindrical roller bearing with aligning housing ring will not be adversely affected.

Furthermore, the outer ring of the cylindrical roller bearing with aligning housing ring is used also as a bearing ring of the tapered roller thrust bearing. Therefore, the entire axial width of the rolling bearing device including the cylindrical roller bearing with aligning housing ring and the tapered roller thrust bearing can be reduced as much as possible, and besides the number of the component parts can be reduced.

Furthermore, in this rolling bearing device, it is only necessary to support the cylindrical roller bearing with aligning housing ring by a housing, and the tapered roller thrust bearing does not need to be supported by the housing. Therefore, the structure of this housing can be simplified.

Furthermore, the intersection of lines extended from generatrices of each of the tapered rollers which are in contact with the first raceway surface and the second raceway surface, and the intersection of lines extended from the first raceway surface and the second raceway surface are disposed on a curvature center of the aligning sliding surface. Therefore, when the tapered roller thrust bearing is rotated about the curvature center by the deflection of the rotation shaft or the like, the tapered roller and the first and second raceway surfaces will not be brought into hard partial contact with each other and will not be partially separated from each other, so that the tapered roller and the first and second raceway surfaces can be held in line contact with each other with a uniform pressure. Therefore, damage caused when the tapered roller come in partial contact with the first and second raceway surfaces can be prevented.

In the above construction, it is preferable that the side raceway ring and the tapered rollers are disposed within a curvature radius of the aligning sliding surface. In this case, even when the outer ring is slid on the aligning sliding surface, the side raceway ring and the tapered rollers will not interfere with the aligning housing ring. Therefore, the aligning function of the cylindrical roller bearing with aligning housing ring can be suitably maintained.

According to the rolling bearing device of the present invention, an axial load can be supported by the tapered roller thrust bearing while maintaining the aligning function achieved by the cylindrical roller bearing with aligning housing ring, and also can be formed into the compact construction in the axial direction.

A roll apparatus for a continuous casting installation, according to the present invention, comprises:
  a roll body, adapted to transport a cast piece;
  a housing; and
  the above rolling bearing device,
  wherein the inner ring and the side raceway ring are fitted with the roll body, and the aligning housing ring is fitted with the housing.

BEST MODE FOR CARRYING OUT THE INVENTION

Figure 1:
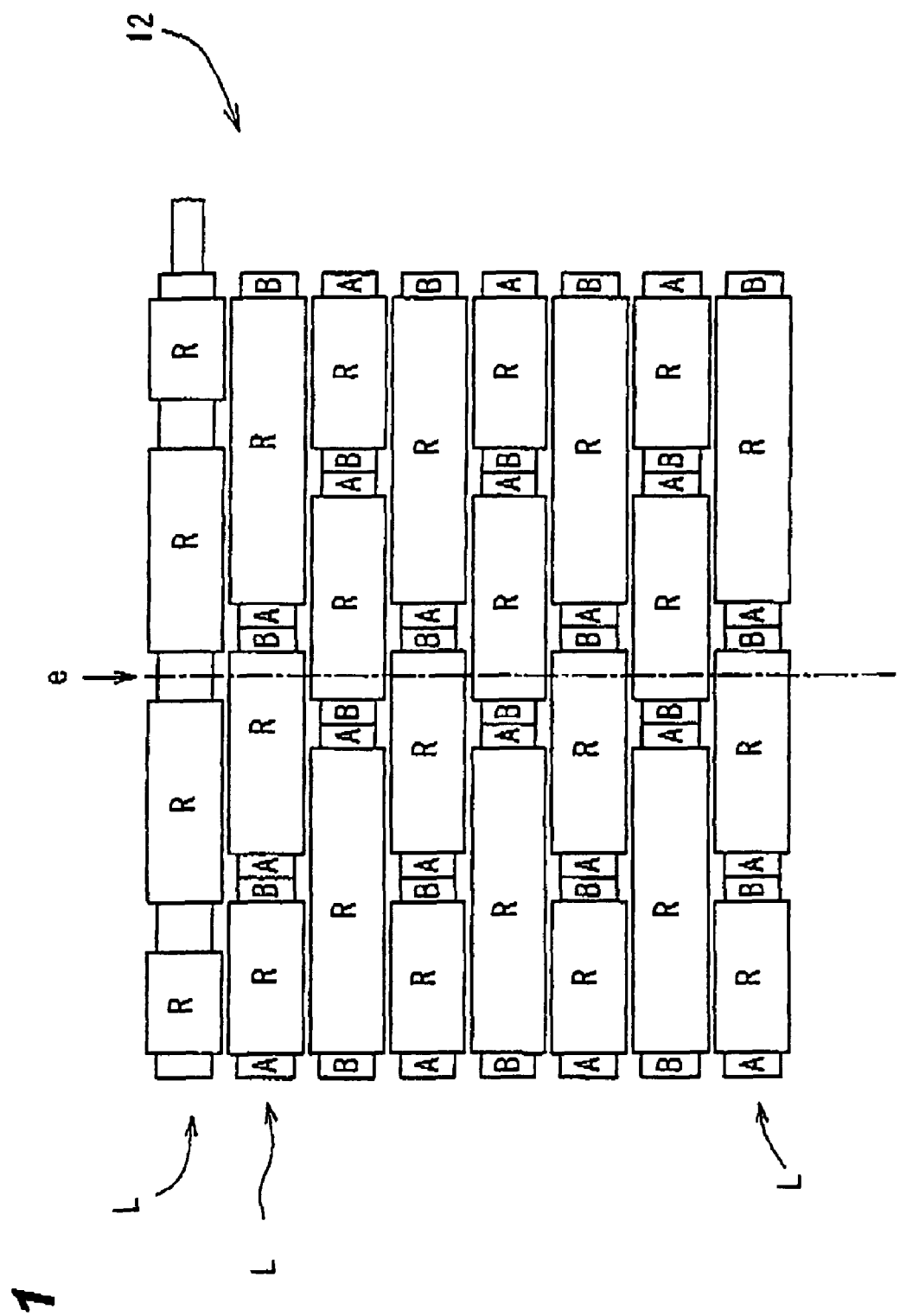
FIG. 1 is a plan view of a roll apparatus used in a continuous casting installation.

FIG. 1 is a plan view showing part of a roll apparatus used in a continuous casting apparatus. This roll apparatus is constructed such that a large number of roll bodies R (roll body rows L) are arranged in a slab conveying direction "e", and one segment 12 is constituted by a plurality of roll body rows L. The whole of the roll apparatus is constituted by arranging a plurality of segments 12 in the slab conveying direction "e" in a combined manner.

One roll body row L is formed by a plurality of (for example, no smaller than two) roll bodies R arranged coaxially in the axial direction, and both ends of each roll body R are rotatably supported respectively by two kinds of rolling bearings A, B each having an aligning function. One rolling bearing A is a free rolling bearing, and supports the roll body R in such a manner that the roll body can be moved in the axial direction. This free rolling bearing A is, for example, a cylindrical roller bearing provided with inner and outer rings and cylindrical rollers, and has such a structure as to allow a relative axial slide between the cylindrical rollers and the inner ring or the outer ring.

Figure 2:
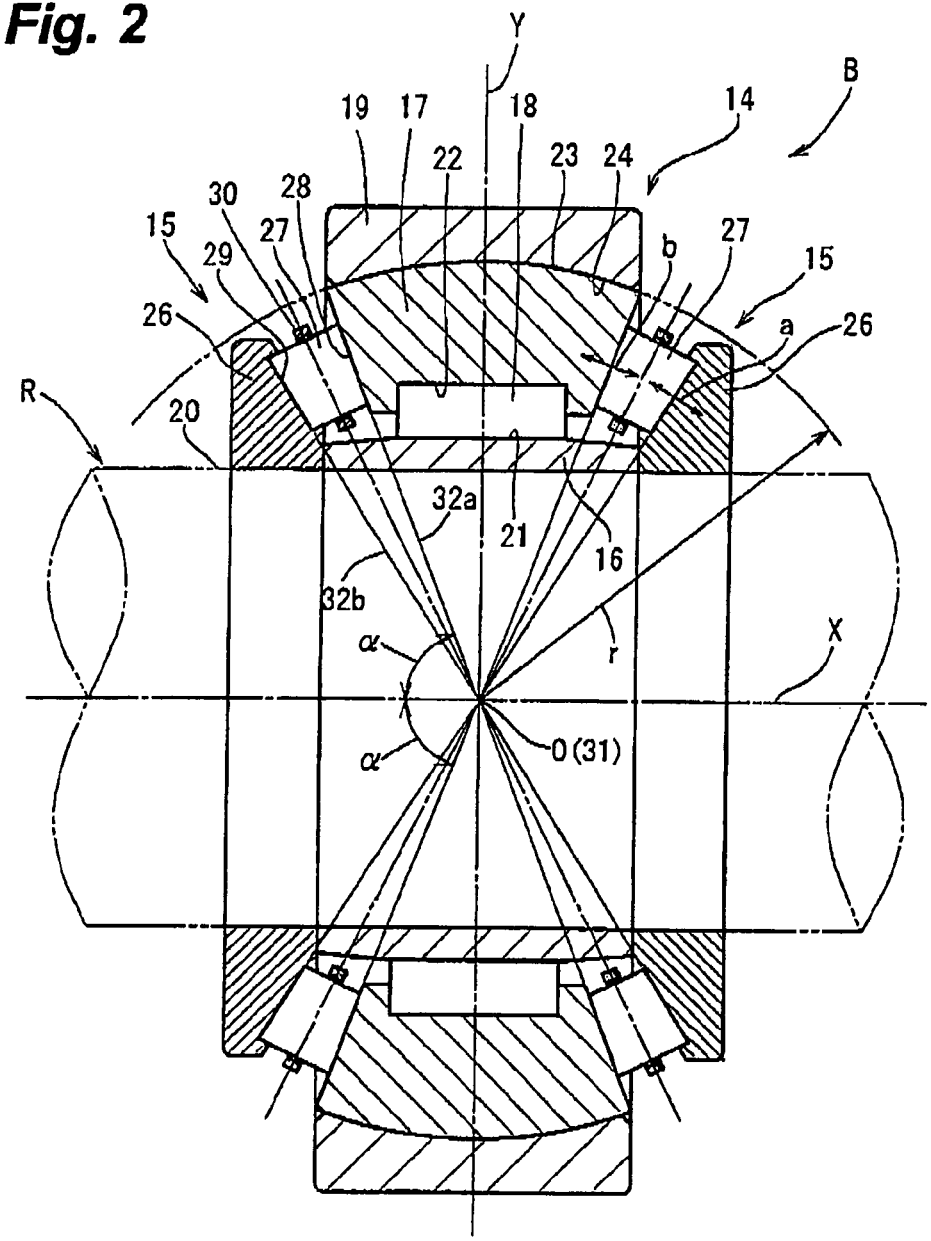
FIG. 2 is a section view of a rolling bearing device of the present invention viewed from an axial direction.

The other rolling bearing B is formed as a fixing rolling bearing for restraining the axial movement of the roll body R. FIG. 2 is a section view of the fixing rolling bearing viewed from the axial direction. This fixing rolling bearing B is constituted by a rolling bearing device of the present invention including a structure serving as a cylindrical roller bearing with aligning housing ring 14 and a structure serving as a tapered roller thrust bearings 15.

The cylindrical roller bearing with aligning housing ring 14 includes an inner ring 16, an outer ring 17, cylindrical rollers 18, and an aligning housing ring 19. A journal portion (rotation shaft) 20 of the roll body R is fitted in an inner circumference of the inner ring 16, and an inner ring raceway surface 21 on which the cylindrical rollers 18 roll is formed at an outer circumference thereof. Any rib with which end faces of the cylindrical rollers 18 can come in contact is not formed at both sides in the axial direction of the inner ring raceway surface 21. On the other hand, an outer ring raceway surface 22 on which the cylindrical rollers 18 roll is formed at an inner circumference of the outer ring 17, and an arcuate outer ring sliding surface 23 is protruded at an outer circumference thereof. Ribs having rib surfaces with which the end faces of the cylindrical rollers 18 can come in contact are formed respectively at both sides in the axial direction of the outer ring raceway surface 22. An axial length of the cylindrical roller 18 is slightly shorter than the length between the rib surfaces formed respectively at the both sides in the axial direction.

The cylindrical rollers 18 are of the full complement type, and are disposed between the outer ring raceway surface 22 and the inner ring raceway surface 21. The aligning housing ring 19 has an arcuate aligning sliding surface 24 recessed at an inner circumference thereof, and its outer peripheral surface is supported by a housing which is not shown. The outer ring sliding surface 23 of the outer ring 17 is slidably held against the aligning sliding surface 24 of the aligning housing ring 19 so as to allow the inclination of the journal portion 20 due to deflection of the roll body R and so on.

The tapered roller thrust bearings 15 are provided respectively at both sides in the axial direction of the cylindrical roller bearing with aligning housing ring 14. The tapered roller thrust bearings 15 are formed symmetrically with respect to a vertical axis Y of the cylindrical roller bearing with aligning housing ring 14.

The tapered roller thrust bearing 15 comprises the above-mentioned outer ring 17, a side raceway ring 26, and a plurality of tapered rollers 27. The outer ring 17 is shared with the cylindrical roller bearing with aligning housing ring 14. Outer side surfaces in the axial direction of the outer ring 17 serve respectively as first raceway surfaces 28 on which the tapered rollers 27 can roll. This first raceway surface 28 is inclined inwards of the axial direction of the cylindrical roller bearing with aligning housing ring 14 from an outer side to an inner side in the radial direction.

The side raceway ring 26 is formed into an annular shape, and the journal portion 20 of the roll body R is fitted in its inner peripheral surface. Therefore, the side raceway ring 26 can rotate together with the journal portion 20, and is restrained from axial movement. That side surface of the side raceway ring 26 opposed to the first raceway surface 28 serves as a second raceway surface 29, and the plurality of tapered rollers 27 are disposed between the first raceway surface 28 and the second raceway surface 29. The second raceway surface 29 is inclined toward the outer ring from an outer side to an inner side in the radial direction. Ribs for restraining the radial movement of the tapered rollers 27 are formed respectively at both sides of the second raceway surface 29 in the radial direction.

The tapered rollers 27 are held by a cage 30. An outer peripheral surface of the tapered roller 27 is disposed in line contact with the first and second raceway surfaces 28, 29. Therefore, extension lines of opposite generatrices of the tapered roller 27 respectively in contact with the first and second raceway surfaces 28, 29 are so set as to coincide with extension lines of the first and second raceway surfaces 28, 29, respectively (These extension lines are designated by reference numerals 32a, 32b). Further, in each tapered roller thrust bearing 15, the shapes of the tapered roller 27 and first and second raceway surfaces 28, 29 are set such that a point 31 of intersection (a cone apex of the tapered roller 27) of the extension lines of the above generatrices of the tapered roller 27 and a point of intersection of the extension lines of the first and second raceway surfaces 28, 29 are disposed at a point on an axis X of the journal portion 20 (axis of the rolling bearing device). With this arrangement, the tapered roller 27 rolls on the first and second raceway surfaces 28, 29 without any slip. A contact angle α of the first raceway surface 28 of the outer ring 17 is set to be no smaller than 45 degrees.

Further, the shapes and arrangement of the tapered roller 27 and first and second raceway surfaces 28, 29 are set such that the cone apex 31 of the tapered roller 27 and the point of intersection of the extension lines 32a, 32b of the first and second raceway surfaces 28, 29 are also disposed at a curvature center O of the aligning sliding surface 24 of the aligning housing ring 19.

In the rolling bearing device B of this embodiment having the above construction, a radial load applied from the roll body R can be supported by the cylindrical roller bearing with aligning housing ring 14, and axial loads can be supported by the tapered roller thrust bearings 15. Furthermore, part of the radial load can be supported also by the tapered roller thrust bearings 15. Therefore, a loading capacity of the rolling bearing device for the radial load can be enhanced.

When the journal portion 20 is inclined by deflection of the roller body R, the outer ring 17 of the cylindrical roller bearing with aligning housing ring 14 is slid on the aligning sliding surface 24 (rotated about the curvature center O). At this time, the tapered rollers 27 and the side raceway rings 26 are also rotated together with the outer ring 17. Therefore, the aligning function will not be adversely affected by the existence of the tapered rollers 27 and side raceway rings 26.

Furthermore, the cone apex 31 of the tapered roller 27 and the point of intersection of the extension lines of the first and second raceway surfaces 28, 29 are disposed at the curvature center O. Therefore, when a rotating force about the curvature center O is produced by inclination of the journal portion 20, this rotating force acts in directions "a" and "b" which are respectively perpendicular to the contact lines of the tapered roller 27 with the first and second raceway surfaces 28, 29, and these line contacts are properly maintained. Namely, by this rotating force, the first and second raceway surfaces 28, 29 and the tapered roller 27 will not be brought into partial press contact with each other or will not be partially separated from each other, but are held in line contact with a uniform pressure. Therefore, damage (scarring) resulting from press contact of a portion (for example, a corner portion) of the tapered roller 27 with the first and second raceway surfaces 28 and 29 can be prevented.

Since the outer ring 17 is used in common for the cylindrical roller bearing with aligning housing ring 14 and the tapered roller thrust bearings 15, the whole axial dimension of the rolling bearing device can be reduced as much as possible, and besides the number of the component parts can be reduced, as compared with the case where the bearings are provided as independent members.

Furthermore, in this rolling bearing device, it is only necessary to support the outer circumference of the aligning housing ring 19 of the cylindrical roller bearing with aligning housing ring 14 by a housing, and the tapered roller thrust bearings 15 do not need to be directly supported by the housing. Therefore, the structure of this housing will not become complicated.

The side raceway rings 26 and the tapered rollers 27 are disposed within a curvature radius "r" of the aligning sliding surface 24. Therefore, even when these members are rotated about the curvature center O, they will not come in contact with the aligning housing ring 19, and the aligning function will not be adversely affected.

The present invention is not limited to the above embodiment, and suitable design changes can be made within the scope of the claims. For example, depending on the direction of the axial load, the tapered roller thrust bearing 15 can be provided only at one side of the cylindrical roller bearing with aligning housing ring 14 in the axial direction. Furthermore, the rolling bearing device of the present invention is not limited to the use for supporting the roll body in the continuous casting installation, and can also be applied to a bearing device of other installations and apparatuses such as a bearing device for supporting a main shaft of a wind turbine generator.

The invention claimed is:

1. A rolling bearing device, comprising:
   an inner ring, comprising an outer circumference formed with an inner raceway surface;
   an outer ring, comprising:
       an inner circumference, formed with an outer raceway surface;
       an axial outer side face, formed with a first raceway surface; and
       an outer circumference, formed with an outer sliding surface having a convex-arcuate axial cross section;
   a plurality of cylindrical rollers, rollably disposed between the inner raceway surface and the outer raceway surface;
   an aligning housing ring, comprising an inner circumference formed with an aligning sliding surface having a concave-arcuate axial cross section and being in slidable contact with the outer sliding surface;
   a side raceway ring, disposed in an axial outer side of the outer ring and formed with a second raceway surface opposing the first raceway surface; and
   a plurality of tapered rollers, disposed between the first raceway surface and the second raceway surface, wherein:
   an intersection of lines extended from generatrices of each of the tapered rollers which are in contact with the first raceway surface and the second raceway surface, and an intersection of lines extended from the first raceway surface and the second raceway surface are disposed on a curvature center of the aligning sliding surface.

2. The rolling bearing device as set forth in claim 1, wherein:
   the side raceway ring and the tapered rollers are disposed within a curvature radius of the aligning sliding surface.

3. A roll apparatus for a continuous casting installation, comprising:

a roll body, adapted to transport a cast piece;

a housing; and the rolling bearing device as set forth in claim 2, wherein:

the inner ring and the side raceway ring are fitted with the roll body, and the aligning housing ring is fitted with the housing.

4. A roll apparatus for a continuous casting installation, comprising:

a roll body, adapted to transport a cast piece;

a housing; and the rolling bearing device as set forth in claim 1, wherein:

the inner ring and the side raceway ring are fitted with the roll body, and the aligning housing ring is fitted with the housing.

* * * * *